US012322313B2

(12) United States Patent
Fan et al.

(10) Patent No.: US 12,322,313 B2
(45) Date of Patent: Jun. 3, 2025

(54) DRIVING CIRCUIT, DRIVING MODULE, DRIVING METHOD AND DISPLAY DEVICE

(71) Applicants: Yunnan Invensight Optoelectronics Technology Co., Ltd., Yunnan (CN); BOE Technology Group Co., Ltd., Beijing (CN)

(72) Inventors: Longfei Fan, Beijing (CN); Pengcheng Lu, Beijing (CN)

(73) Assignees: Yunnan Invensight Optoelectronics Technology Co., Ltd., Yunnan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/926,959

(22) PCT Filed: Nov. 23, 2021

(86) PCT No.: PCT/CN2021/132572
§ 371 (c)(1),
(2) Date: Nov. 21, 2022

(87) PCT Pub. No.: WO2023/092304
PCT Pub. Date: Jun. 1, 2023

(65) Prior Publication Data

US 2024/0242649 A1 Jul. 18, 2024

(51) Int. Cl.
*G09G 3/20* (2006.01)

(52) U.S. Cl.
CPC ....... *G09G 3/20* (2013.01); *G09G 2300/0852* (2013.01); *G09G 2310/061* (2013.01); *G09G 2310/08* (2013.01)

(58) Field of Classification Search
CPC ............. G09G 3/20; G09G 2300/0852; G09G 2310/061; G09G 2310/08; G09G 3/3208; G09G 3/3266
See application file for complete search history.

(56) References Cited

U.S. PATENT DOCUMENTS 10,997,936 B2 * 5/2021 Xu ........................... G09G 3/20
11,514,840 B2 * 11/2022 Jang ........................... G09G 3/32
(Continued)

FOREIGN PATENT DOCUMENTS

CN 105185318 A 12/2015
CN 106952602 A 7/2017
(Continued)

*Primary Examiner* — Jeff Piziali
(74) *Attorney, Agent, or Firm* — IPro, PLLC

(57) ABSTRACT

A driving circuit includes a driving signal output terminal, a first node control circuit, an on-off control circuit and a first output circuit. The first node control circuit controls to connect or disconnect the first node and the first voltage terminal under the control of a first control signal, and control to connect or disconnect the first node and the first voltage terminal under the control of a first clock signal; the first control terminal is different from the first clock signal terminal. The on-off control circuit controls to connect or disconnect the first node and the first output control terminal under the control of a second voltage signal; the first output circuit controls to connect or disconnect the driving signal output terminal and the first clock signal terminal under the control of a potential of the first output control terminal.

19 Claims, 9 Drawing Sheets

(56) References Cited

U.S. PATENT DOCUMENTS

| | | | | |
|---|---|---|---|---|
| 11,551,619 | B2 * | 1/2023 | Seo | G09G 3/3266 |
| 11,657,760 | B2 * | 5/2023 | Park | G09G 3/3225 345/212 |
| 2002/0154253 | A1 * | 10/2002 | Cairns | G02F 1/136213 349/43 |
| 2011/0273418 | A1 | 11/2011 | Park | |
| 2012/0044133 | A1 | 2/2012 | Nakamizo et al. | |
| 2017/0287423 | A1 | 10/2017 | Yang et al. | |
| 2018/0151650 | A1 * | 5/2018 | Ha | H01L 27/124 |
| 2018/0261164 | A1 | 9/2018 | Zhu et al. | |
| 2019/0304560 | A1 | 10/2019 | Xiang et al. | |
| 2019/0348007 | A1 | 11/2019 | Lee et al. | |
| 2020/0294461 | A1 * | 9/2020 | Xu | G09G 3/3677 |
| 2021/0074215 | A1 * | 3/2021 | Park | G09G 3/3225 |
| 2021/0407358 | A1 | 12/2021 | Feng et al. | |

FOREIGN PATENT DOCUMENTS

| | | | |
|---|---|---|---|
| CN | 107749276 | A | 3/2018 |
| CN | 108172195 | A | 6/2018 |
| CN | 110689848 | A | 1/2020 |
| CN | 111462666 | A | 7/2020 |
| CN | 111710285 | A | 9/2020 |
| CN | 113362766 | A | 9/2021 |
| CN | 113436585 | A | 9/2021 |
| WO | 2021072734 | A1 | 4/2021 |

* cited by examiner

DRIVING CIRCUIT, DRIVING MODULE, DRIVING METHOD AND DISPLAY DEVICE

This application is the U.S. national phase of PCT Application No. PCT/CN2021/132572 filed on Nov. 23, 2021, which is incorporated herein by reference in its entirety.

TECHNICAL FIELD

The present disclosure relates to the field of display technology, in particular to a driving circuit, a driving module, a driving method and a display device.

BACKGROUND

A related driving circuit applied to a silicon-based Organic Light Emitting Diode (OLED) display device only uses N-type transistors or P-type transistors. When the relevant driving circuit is in operation, the situation that the driving circuit cannot output the driving signal normally occurs in the output phase.

SUMMARY

In a first aspect, an embodiment of the present disclosure provides a driving circuit, including a driving signal output terminal, a first node control circuit, an on-off control circuit and a first output circuit; the first node control circuit is respectively electrically connected to a first control terminal, a first voltage terminal, a first node, a second input control terminal and a first clock signal terminal, and is configured to control to connect or disconnect the first node and the first voltage terminal under the control of a first control signal provided by the first control terminal, and control to connect or disconnect the first node and the first voltage terminal under the control of a first clock signal provided by the first clock signal terminal; the first control terminal is different from the first clock signal terminal; the on-off control circuit is electrically connected to a second voltage terminal, the first node and the first output control terminal respectively, and is configured to control to connect or disconnect the first node and the first output control terminal under the control of a second voltage signal provided by the second voltage terminal; the first output circuit is electrically connected to the first output control terminal, the first clock signal terminal and the driving signal output terminal respectively, and is configured to control to connect or disconnect the driving signal output terminal and the first clock signal terminal under the control of a potential of the first output control terminal.

Optionally, transistors included in the first node control circuit are all p-type transistors; or, the transistors included in the first node control circuit are all n-type transistors; the first control signal and the first clock signal are inversed in phase.

Optionally, the driving circuit further includes a second output control terminal control circuit and a second output circuit; wherein the second output control terminal control circuit is electrically connected to the first node, the second output control terminal, a second clock signal terminal and a second voltage terminal respectively, and is configured to control to connect or disconnect the second output control terminal and the second clock signal terminal under the control of a potential of the first node, control to connect or disconnect the second output control terminal and the second voltage terminal under the control of a second clock signal provided by the second clock signal terminal; the second output circuit is respectively electrically connected to the second output control terminal, the first voltage terminal and the driving signal output terminal, and is configured to control to connect or disconnect the driving signal output terminal and the first voltage terminal under the control of a potential of the second output control terminal.

Optionally, the first node control circuit is electrically connected to a second output control terminal, a second clock signal terminal and an input terminal, respectively, is configured to control to connect or disconnect the first node and the first voltage terminal under the control of a potential of the second output control terminal, and control to connect or disconnect the first node and the input terminal under the control of a second clock signal provided by the second clock signal terminal.

Optionally, the first node control circuit includes a first transistor, a second transistor, a third transistor and a fourth transistor; a control electrode of the first transistor is electrically connected to the second clock signal terminal, a first electrode of the first transistor is electrically connected to the input terminal, and a second electrode of the first transistor is electrically connected to the first node; a control electrode of the second transistor is electrically connected to the first clock signal terminal, and a first electrode of the second transistor is electrically connected to the first node; a control electrode of the third transistor is electrically connected to the second output control terminal, a first electrode of the third transistor is electrically connected to a second electrode of the second transistor, and a second electrode of the third transistor is electrically connected to the first voltage terminal; the first voltage terminal is electrically connected to the second electrode of the third transistor through the fourth transistor; or, the first electrode of the third transistor is connected to the second electrode of the second transistor through the fourth transistor; or the first electrode of the second transistor is electrically connected to the first node through the fourth transistor; a control electrode of the fourth transistor is electrically connected to the first control terminal.

Optionally, the first node control circuit is electrically connected to a second output control terminal, a second clock signal terminal and an input terminal, respectively, is configured to control to connect or disconnect the first node and the first voltage terminal under the control of a potential of the second output control terminal, and control to connect or disconnect the first node and the input terminal under the control of the first control signal and a second clock signal provided by the second clock signal terminal.

Optionally, the first node control circuit includes a first transistor, a second transistor, a third transistor and a fourth transistor; a control electrode of the first transistor is electrically connected to the second clock signal terminal, a first electrode of the first transistor is electrically connected to the input terminal, and a second electrode of the first transistor is electrically connected to a second node; a control electrode of the second transistor is electrically connected to the first clock signal terminal, and a first electrode of the second transistor is electrically connected to the second node; a control electrode of the third transistor is electrically connected to the second output control terminal, a first electrode of the third transistor is electrically connected to the second electrode of the second transistor, and a second electrode of the third transistor is electrically connected to the first voltage terminal; a control electrode of the fourth transistor is electrically connected to the first control terminal, a first electrode of the fourth transistor is electrically connected to the second node, and a second electrode of the fourth transistor is electrically connected to the first node.

Optionally, the fourth transistor is a dual gate transistor.

Optionally, a width-to-length ratio of the fourth transistor is equal to a width-to-length ratio of the second transistor.

Optionally, the driving circuit further includes a first energy storage circuit and a second energy storage circuit; wherein the first energy storage circuit is electrically connected to the first output control terminal, and is configured to store electrical energy; the second energy storage circuit is electrically connected to the second output control terminal, and is configured to store electrical energy.

Optionally, the first energy storage circuit includes a first capacitor, and the second energy storage circuit includes a second capacitor; a first terminal of the second capacitor is electrically connected to the second output control terminal, and a second terminal of the second capacitor is electrically connected to the first voltage terminal; a first terminal of the first capacitor is electrically connected to the first output control terminal, and a second terminal of the first capacitor is electrically connected to the driving signal output terminal.

Optionally, the second output control terminal control circuit includes a fifth transistor and a sixth transistor; a control electrode of the fifth transistor is electrically connected to the second clock signal terminal, a first electrode of the fifth transistor is electrically connected to the second voltage terminal, and a second electrode of the fifth transistor is electrically connected to the second output control terminal; a control electrode of the sixth transistor is electrically connected to the first node, a first electrode of the sixth transistor is electrically connected to the second clock signal terminal, and a second electrode of the sixth transistor is electrically connected to the second output control terminal.

Optionally, the on-off control circuit comprises a seventh transistor; a control electrode of the seventh transistor is electrically connected to the second voltage terminal, a first electrode of the seventh transistor is electrically connected to the first node, and a second electrode of the seventh transistor is electrically connected to the first output control terminal.

Optionally, the first output circuit includes a first output transistor, and the second output circuit includes a second output transistor; a control electrode of the first output transistor is electrically connected to the first output control terminal, a first electrode of the first output transistor is electrically connected to the first clock signal terminal, and a second electrode of the first output transistor is electrically connected to the driving signal output terminal; a control electrode of the second output transistor is electrically connected to the second output control terminal, a first electrode of the second output transistor is electrically connected to the first voltage terminal, and a second electrode of the second output transistor is electrically connected to the driving signal output terminal.

Optionally, a width-to-length ratio of the first output transistor is greater than a width-to-length ratio of the second output transistor.

In a second aspect, a driving module includes a plurality of stages of driving circuits.

In a third aspect, a driving method is applied to the driving circuit, wherein the display period includes an output phase; the driving method includes: in the output phase, controlling, by the first node control circuit, to disconnect the first node from the first voltage terminal under the control of the first control signal, and controlling, by the on-off control circuit, to connect the first node and the first output control terminal under the control of the second voltage signal, and controlling, by the first output circuit, to connect the driving signal output terminal and the first clock signal terminal under the control of the potential of the first output control terminal.

Optionally, the driving circuit further includes a second output control terminal control circuit and a second output circuit; the display period further includes an input phase arranged before the output phase; the driving method further includes: in the input phase, controlling, by the second output control terminal control circuit, to connect the second output control terminal and the second voltage terminal under the control of the second clock signal, so that the second output circuit controls to connect the driving signal output terminal and the first voltage terminal under the control of a potential of the second output control terminal; in the output phase, controlling, by the second output control terminal control circuit, to connect the second output control terminal and the second clock signal terminal under the control of a potential of the first node, so that the second output circuit controls to disconnect the driving signal output terminal from the first voltage terminal under the control of a potential of the second output control terminal.

Optionally, the first node control circuit is further electrically connected to the second clock signal terminal and the input terminal respectively; the driving circuit further includes a first energy storage circuit and a second energy storage circuit; the driving method further includes: in the input phase, providing, by the input terminal, an input signal, and controlling, by the first node control circuit, the input terminal to provide the input signal to the first node under the control of the second clock signal; controlling, by the on-off control circuit, to connect the first node and the first output control terminal under the control of the second voltage signal provided by the second voltage terminal, to charge the first energy storage circuit, and controlling, by the first output circuit, to connect the driving signal output terminal and the first clock signal terminal under the control of a potential of the first output control terminal.

Optionally, the display period further includes a reset phase after the output phase; the reset phase includes a first reset period and a second reset period; the driving method further includes: in the first reset period, providing, by the input terminal, the first voltage signal, and the potential of the second clock signal provided by the second clock signal terminal being the second voltage; controlling, by the first node control circuit, to connect the first node and the input terminal under the control of the second clock signal, so that the potential of the first node is the first voltage, and controlling, by the on-off control circuit, to connect the first node and the first output control terminal under the control of the second voltage signal provided by the second voltage terminal, to charge the first energy storage circuit, so that the potential of the first output control terminal is the first voltage; controlling, by the first output circuit, to disconnect the driving signal output terminal from the first clock signal terminal under the control of the potential of the first output control terminal; controlling, by the second output control terminal control circuit, to connect the second output control terminal and the second voltage terminal under the control of the second clock signal to charge the second energy storage circuit, so that the potential of the second output control terminal is the second voltage, and controlling, by the second output circuit, to connect the driving signal output terminal and the first voltage terminal under the control of the potential of the second output control terminal; in the second reset period, maintaining, by the second energy storage circuit, the potential of the second output control terminal, and controlling, by the second output circuit, to connect the driving signal output terminal and the first voltage terminal under the control of a potential of the second output control terminal; maintaining, by the first energy storage circuit, the potential of the first output control terminal, and controlling, by the first output circuit, to disconnect the driving signal output terminal from the first clock signal terminal under the control of the first output control terminal.

In a fourth aspect, a display device includes the driving module.

DETAILED DESCRIPTION

The technical solutions in the embodiments of the present disclosure will be clearly and completely described below with reference to the accompanying drawings in the embodiments of the present disclosure. Obviously, the described embodiments are only a part of the embodiments of the present disclosure, but not all of the embodiments. Based on the embodiments in the present disclosure, all other embodiments obtained by those of ordinary skill in the art without creative work shall fall within the protection scope of the present disclosure.

The transistors used in all the embodiments of the present disclosure may be triodes, thin film transistors, field effect transistors, or other devices with the same characteristics. In the embodiments of the present disclosure, in order to distinguish the two electrodes of the transistor except the control electrode, one electrode is called the first electrode, and the other electrode is called the second electrode.

In actual operation, when the transistor is a thin film transistor or a field effect transistor, the first electrode may be a drain electrode, and the second electrode may be a source electrode; or, the first electrode may be a source electrode, the second electrode may be a drain electrode.

Figure 1:
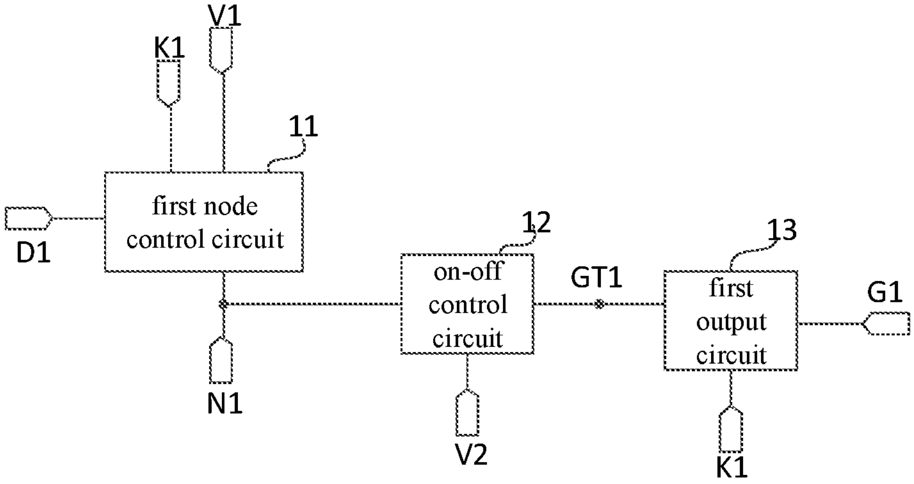
FIG. 1 is a structural diagram of a driving circuit according to an embodiment of the present disclosure.

As shown in FIG. 1, the driving circuit according to the embodiment of the present disclosure includes a driving signal output terminal G1, a first node control circuit 11, an on-off control circuit 12 and a first output circuit 13;

The first node control circuit 11 is respectively electrically connected to a first control terminal DI, a first voltage terminal V1, a first node N1 and a first clock signal terminal K1, and is configured to control to connect or disconnect the first node N1 and the first voltage terminal V1 under the control of a first control signal provided by the first control terminal DI, and control to connect or disconnect the first node N1 and the first voltage terminal V1 under the control of a first clock signal provided by the first clock signal terminal K1; the first control terminal DI is different from the first clock signal terminal K1;

The on-off control circuit 12 is electrically connected to a second voltage terminal V2, the first node and the first output control terminal GT1 respectively, and is configured to control to connect or disconnect the first node N1 and the first output control terminal GT1 under the control of a second voltage signal provided by the second voltage terminal V2;

The first output circuit 13 is electrically connected to the first output control terminal GT1, the first clock signal terminal K1 and the driving signal output terminal G1 respectively, and is configured to control to connect or disconnect the driving signal output terminal G1 and the first clock signal terminal K1 under the control of a potential of the first output control terminal GT1.

In at least one embodiment of the present disclosure, the first voltage terminal may be a high voltage terminal, and the second voltage terminal may be a low voltage terminal, but not limited thereto.

In at least one embodiment of the present disclosure, when all transistors included in the first node control circuit 11 are p-type transistors, or when all transistors included in the first node control circuit 11 are n-type transistors, the first control signal provided by the first control terminal DI is different from the first clock signal provided by the first clock signal terminal K1, so that in the output phase, the first node control circuit 11 can control to disconnect the first node N1 from the first voltage terminal, to prevent the potential of the first node N1 from being affected by the leakage current between the first node N1 and the first voltage terminal V1.

When the driving circuit shown in FIG. 1 of an embodiment of the present disclosure is in operation, the display period includes an output phase;

In the output phase, the first node control circuit 11 controls to disconnect the first node N1 from the first voltage terminal under the control of the first control signal, and the on-off control circuit 12 controls to connect the first node N1 and the first output control terminal GT1 under the control of the second voltage signal, and the first output circuit controls to connect the driving signal output terminal G1 and the first clock signal terminal K1 under the control of the potential of the first output control terminal GT1, so that the driving signal output terminal G1 can normally output the driving signal.

The driving circuit described in the embodiment of the present disclosure controls to disconnect the first node N1 and the first voltage terminal V1 through the first node control circuit 11 in the output phase under the control of the first control signal, so as to avoid the potential of the first node N1 and the potential of the first output control terminal GT1 are the first voltage in the output phase, so that the first output circuit 13 can control to connect the driving signal output terminal G1 and the first clock signal terminal K1 under the control of the potential of the first output control terminal GT1, so as to output the driving signal normally.

In at least one embodiment of the present disclosure, the transistors included in the first node control circuit are all p-type transistors; or, the transistors included in the first node control circuit are all n-type transistors;

The first control signal and the first clock signal are inversed in phase.

During specific implementation, the first control signal provided by the first control terminal and the first clock signal provided by the first clock signal terminal may be set to be mutually inversed in phase, so that the first node control circuit included a transistor whose control electrode is connected the first control signal, transistors whose control electrodes are connected to the first clock signal will not be turned on at the same time, so as to prevent the leakage current between the first node N1 and the first voltage terminal V1 from affecting the potential of the first node N1.

Figure 2:
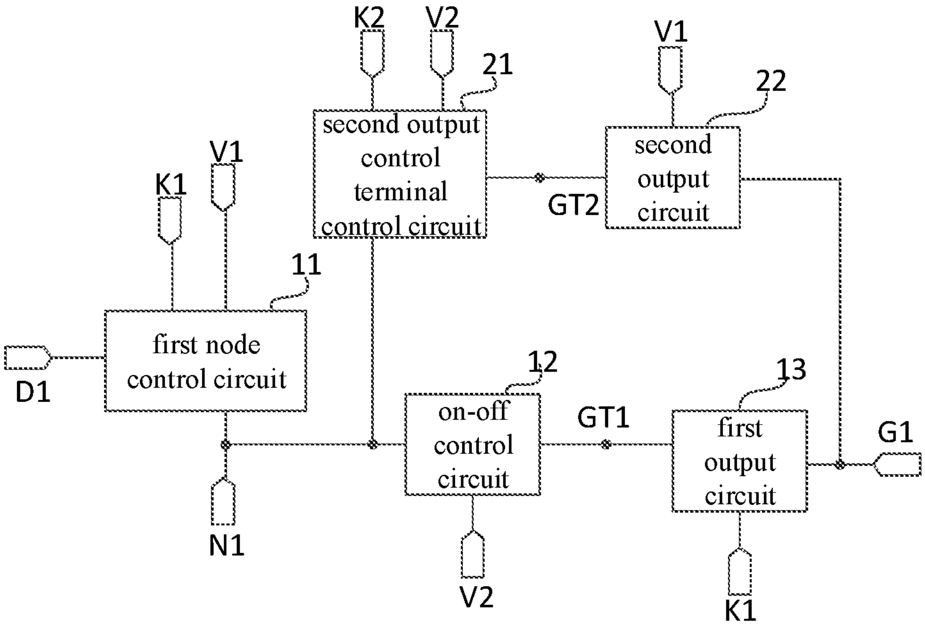
FIG. 2 is a structural diagram of a driving circuit according to at least one embodiment of the present disclosure.

As shown in FIG. 2, based on the embodiment of the driving circuit shown in FIG. 1, the driving circuit described in at least one embodiment of the present disclosure further includes a second output control terminal control circuit 21 and a second output circuit 22;

The second output control terminal control circuit 21 is electrically connected to the first node N1, the second output control terminal GT2, the second clock signal terminal K2 and the second voltage terminal V2 respectively, and is configured to control to connect or disconnect the second output control terminal GT2 and the second clock signal terminal K2 under the control of the potential of the first node N1, control to connect or disconnect the second output control terminal GT2 and the second voltage terminal V2 under the control of the second clock signal provided by the second clock signal terminal K2;

The second output circuit 22 is respectively electrically connected to the second output control terminal GT2, the first voltage terminal V1 and the driving signal output terminal G1, and is configured to control to connect or disconnect the driving signal output terminal G1 and the first voltage terminal V1 under the control of the potential of the second output control terminal GT2.

In at least one embodiment of the present disclosure, the first control terminal may be a third clock signal terminal, but is not limited thereto.

When at least one embodiment of the driving circuit shown in FIG. 2 of the present disclosure is in operation, the display period further includes an input phase arranged before the output phase;

In the input phase, the second output control terminal control circuit 21 controls to connect the second output control terminal GT2 and the second voltage terminal V2 under the control of the second clock signal, so that the second output circuit 22 controls to connect the control driving signal output terminal G1 and the first voltage terminal V1 under the control of the potential of the output control terminal GT2, In the output phase, the second output control terminal control circuit 21 controls to connect the second output control terminal GT2 and the second clock signal terminal K2 under the control of the potential of the first node N1, so that the second output circuit 22 control to disconnect the driving signal output terminal G1 from the first voltage terminal V1 under the control of the potential of the second output control terminal GT2.

When the driving circuit shown in FIG. 2 of at least one embodiment of the present disclosure is in operation, in the output phase, since the first node control circuit 11 controls to prevent the potential of the first node N1 from being pulled up by the first voltage signal, so that in the output phase, the second output control terminal control circuit 21 can control to connect the second output control terminal GT2 and the second clock signal terminal K2 under the control of the potential of the first node N1 to control the transistors included in the second output circuit 22 are turned off to avoid affecting the output terminal G1 of the driving signal to output the driving signal.

In at least one embodiment of the present disclosure, the first node control circuit may also be electrically connected to a second output control terminal, a second clock signal terminal and an input terminal, respectively, is configured to control to connect or disconnect the first node and the first voltage terminal under the control of the potential of the second output control terminal, and control to connect or disconnect the first node and the input terminal under the control of the second clock signal provided by the second clock signal terminal.

The driving circuit described in at least one embodiment of the present disclosure may further include a first energy storage circuit and a second energy storage circuit;

the first energy storage circuit is electrically connected to the first output control terminal, is configured to store electric energy and maintain the potential of the first output control terminal;

The second energy storage circuit is electrically connected to the second output control terminal, is configured to store electrical energy and maintain the potential of the second output control terminal.

Figure 3:
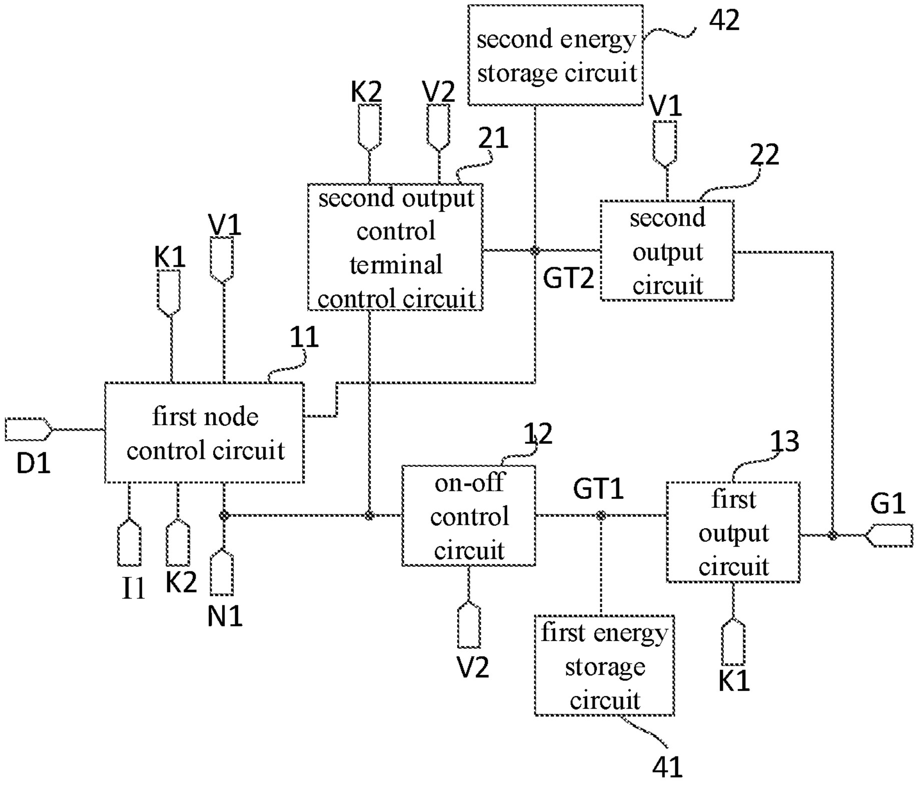
FIG. 3 is a structural diagram of a driving circuit according to at least one embodiment of the present disclosure.

As shown in FIG. 3, on the basis of the driving circuit shown in FIG. 2, the first node control circuit 11 is further connected to the second output control terminal GT2, the second clock signal terminal K2 and the input terminal I1, and is configured to control to connect or disconnect the first node N1 and the input terminal I1 under the control of the second clock signal provided by the second clock signal terminal K2, and control to connect or disconnect the first node N1 and the first voltage terminal V1 under the control of the potential of the second output control terminal GT2;

As shown in FIG. 3, the driving circuit described in at least one embodiment of the present disclosure further includes a first energy storage circuit 41 and a second energy storage circuit 42;

The first energy storage circuit 41 is electrically connected to the first output control terminal GT1, is configured to store electrical energy and maintain the potential of the first output control terminal GT1;

The second energy storage circuit 42 is electrically connected to the second output control terminal GT2, is configured to store electrical energy and maintain the potential of the second output control terminal GT2.

During operation of the driving circuit shown in FIG. 3 of the present disclosure, the display period includes an input phase, an output phase, and a reset phase that are set successively;

In the input phase, the input terminal I1 provides an input signal, and the first node control circuit 11 controls the input terminal I1 to provide the input signal to the first node N1 under the control of the second clock signal; the on-off control circuit 12 controls to connect the first node N1 and the first output control terminal GT1 under the control of the second voltage signal provided by the second voltage terminal V2, to charge the first energy storage circuit 41, and the first output circuit 13 controls to connect the driving signal output terminal G1 and the first clock signal terminal K1 under the control of the potential of the first output control terminal GT1;

In a first reset period included in the reset phase, the input terminal I1 provides the first voltage signal, and the potential of the second clock signal provided by the second clock signal terminal K2 is the second voltage; the first node control circuit 11 controls to connect the first node N1 and the input terminal I1 under the control of the second clock signal, so that the potential of the first node N1 is the first voltage, and the on-off control circuit 12 controls to connect the first node N1 and the first output control terminal GT1 under the control of the second voltage signal provided by the second voltage terminal V2, to charge the first energy storage circuit 41, so that the potential of the first output control terminal GT1 is the first voltage; the first output circuit 13 controls to disconnect the driving signal output terminal G1 from the first clock signal terminal K1 under the control of the potential of the first output control terminal GT1; the second output control terminal control circuit 21 controls to connect the second output control terminal GT2 and the second voltage terminal under the control of the second clock signal, to charge the second energy storage circuit 42, so that the potential of the output control terminal GT2 is the second voltage, and the second output circuit 22 controls to connect the driving signal output terminal G1 and the first voltage terminal V1 under the control of the potential of the second output control terminal GT2;

In the second reset period included in the reset phase, the second energy storage circuit 42 maintains the potential of the second output control terminal GT2, and the second output circuit 22 controls to connect the driving signal output terminal G1 and the first voltage terminal V1 under the control of the potential of the second output control terminal GT2; the first energy storage circuit 41 maintains the potential of the first output control terminal GT1, and the first output circuit 13 control to disconnect the driving signal output terminal G1 from the first clock signal terminal K1 under the control of the first output control terminal GT1.

Optionally, the first node control circuit includes a first transistor, a second transistor, a third transistor and a fourth transistor;

A control electrode of the first transistor is electrically connected to the second clock signal terminal, a first electrode of the first transistor is electrically connected to the input terminal, and a second electrode of the first transistor is electrically connected to the first node;

A control electrode of the second transistor is electrically connected to the first clock signal terminal, and a first electrode of the second transistor is electrically connected to the first node;

A control electrode of the third transistor is electrically connected to the second output control terminal, a first electrode of the third transistor is electrically connected to a second electrode of the second transistor, and a second electrode of the third transistor is electrically connected to the first voltage terminal;

The first voltage terminal is electrically connected to the second electrode of the third transistor through the fourth transistor; or, the first electrode of the third transistor is connected to the second electrode of the second transistor through the fourth transistor; or the first electrode of the second transistor is electrically connected to the first node through the fourth transistor;

A control electrode of the fourth transistor is electrically connected to the first control terminal.

In at least one embodiment of the present disclosure, the first node control circuit may also be electrically connected to a second output control terminal, a second clock signal terminal and an input terminal, respectively, is configured to control to connect or disconnect the first node and the first voltage terminal under the control of the potential of the second output control terminal, and control to connect or disconnect the first node and the input terminal under the control of the first control signal and a second clock signal provided by the second clock signal terminal.

Figure 4:
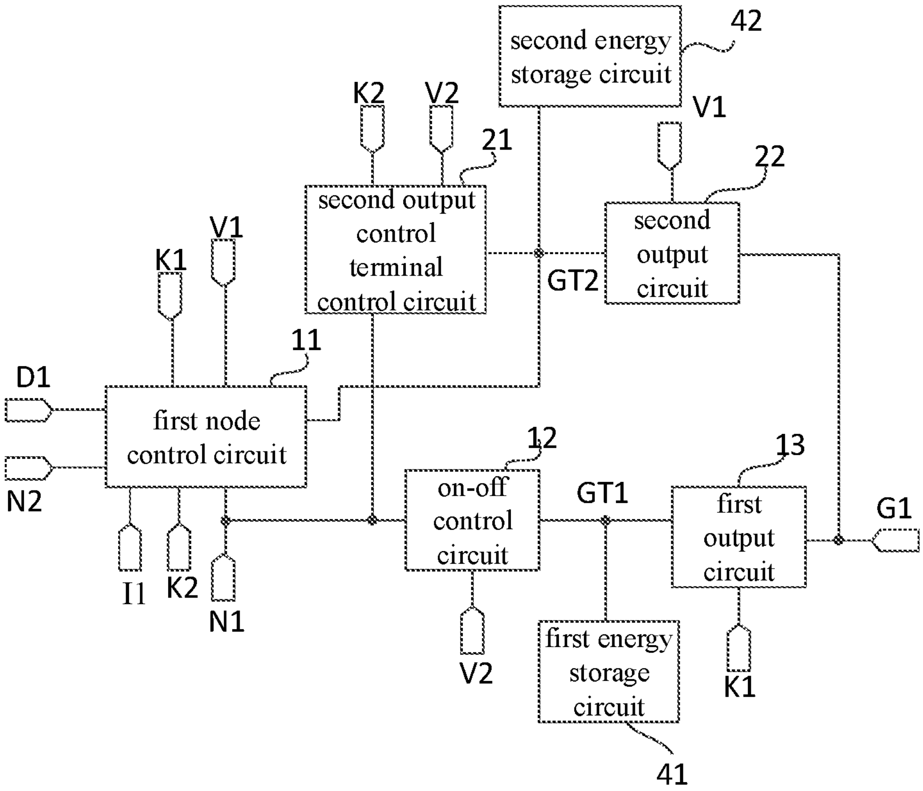
FIG. 4 is a structural diagram of a driving circuit according to at least one embodiment of the present disclosure.

As shown in FIG. 4, on the basis of the driving circuit shown in FIG. 2, the first node control circuit 11 is further connected to the second output control terminal GT2, the second clock signal terminal K2 and the input terminal I1 respectively, and is configured to control to connect or disconnect the first node N1 and the first voltage terminal V1 under the control of the potential of the second output control terminal GT2, and is configured to control to connect or disconnect the first node N1 and the first voltage terminal V1 under the control of the first control signal and the second clock signal provided by the second clock signal terminal K2;

In at least one embodiment shown in FIG. 4, the first node control circuit 11 may also be electrically connected to the second node N2, and the first node control circuit 11 is configured to control to connect or disconnect the input terminal I1 and the second node N2 under the control of the second clock signal, and control to connect or disconnect the second node N2 and the first node N1 under the control of the first control signal;

As shown in FIG. 4, the driving circuit described in at least one embodiment of the present disclosure further includes a first energy storage circuit 41 and a second energy storage circuit 42;

The first energy storage circuit 41 is electrically connected to the first output control terminal GT1, is configured to store electrical energy and maintain the potential of the first output control terminal GT1;

The second energy storage circuit 42 is electrically connected to the second output control terminal GT2, is configured to store electrical energy and maintain the potential of the second output control terminal GT2.

During operation of the driving circuit shown in FIG. 4 of at least one embodiment of the present disclosure, the display period includes an input phase, an output phase, and a reset phase that are set successively;

In the input phase, the input terminal I1 provides an input signal, and the first node control circuit 11 controls the input terminal I1 to provide the input signal to the second node N2 under the control of the second clock signal, and the first node control circuit 11 controls to connect the second node N2 and the first node N1 under the control of the first control signal, so as to write the input signal into the first node N1; the on-off control circuit 12 is configured to control to connect the first node N1 and the first output control terminal GT1 under the control of the second voltage signal provided by the second voltage terminal V2, to charge the first energy storage circuit 41, and the first output the circuit 13 controls to connect the driving signal output terminal G1 and the first clock signal terminal K1 under the control of the potential of the first output control terminal GT1;

In the first reset period included in the reset phase, the input terminal I1 provides the first voltage signal, and the potential of the second clock signal provided by the second clock signal terminal K2 is the second voltage; the first node control circuit 11 controls to connect the second node N2 and the input terminal I1 under the control of the second clock signal, and controls to connect the second node N2 and the first node N1 under the control of the first control signal, so that the potential of the first node N1 is the first voltage, the on-off control circuit 12 controls to connect the first node N1 and the first output control terminal GT1 under the control of the second voltage signal provided by the second voltage terminal V2, to charge the first energy storage circuit 41, so that the potential of the first output control terminal GT1 is the first voltage; the first output circuit 13 controls to disconnect the driving signal output terminal G1 from the first clock signal terminal K1 under the control of the potential of the first output control terminal GT1, the second output control terminal control circuit 21 controls to connect the second output control terminal GT2 and the second voltage terminal under the control of the second clock signal, to charge the second energy storage circuit 42, so that the potential of the second output control terminal GT2 is the second voltage, and the second output circuit 22 controls to connect the driving signal output terminal G1 and the first voltage terminal V1 under the control of the potential of the second control terminal GT2;

In the second reset period included in the reset phase, the second energy storage circuit 42 maintains the potential of the second output control terminal GT2, and the second output circuit 22 controls to connect the driving signal output terminal G1 and the first voltage terminal V1 under the control of the potential of the second output control terminal GT2; the first energy storage circuit 41 maintains the potential of the first output control terminal GT1, and the first output circuit 13 controls to disconnect the driving signal output terminal G1 from the first clock signal terminal K1 under the control of the first output control terminal GT1.

Optionally, the first node control circuit includes a first transistor, a second transistor, a third transistor and a fourth transistor;

A control electrode of the first transistor is electrically connected to the second clock signal terminal, a first electrode of the first transistor is electrically connected to the input terminal, and a second electrode of the first transistor is electrically connected to the second node;

A control electrode of the second transistor is electrically connected to the first clock signal terminal, and a first electrode of the second transistor is electrically connected to the second node;

A control electrode of the third transistor is electrically connected to the second output control terminal, a first electrode of the third transistor is electrically connected to the second electrode of the second transistor, and a second electrode of the third transistor is electrically connected to the first voltage terminal;

A control electrode of the fourth transistor is electrically connected to the first control terminal, a first electrode of the fourth transistor is electrically connected to the second node, and a second electrode of the fourth transistor is electrically connected to the first node.

In at least one embodiment of the present disclosure, the fourth transistor may be a dual-gate transistor to further reduce leakage current.

Optionally, a width-to-length ratio of the fourth transistor is equal to a width-to-length ratio of the second transistor.

In a specific implementation, both the fourth transistor and the second transistor are switching transistors, and the width-to-length ratio of the fourth transistor and the width-to-length ratio of the second transistor may be equal to facilitate design. However, in at least one embodiment of the present disclosure, the width-to-length ratio of the fourth transistor and the width-to-length ratio of the second transistor may not be equal.

Optionally, the first energy storage circuit includes a first capacitor, and the second energy storage circuit includes a second capacitor;

A first terminal of the second capacitor is electrically connected to the second output control terminal, and a second terminal of the second capacitor is electrically connected to the first voltage terminal;

A first terminal of the first capacitor is electrically connected to the first output control terminal, and a second terminal of the first capacitor is electrically connected to the driving signal output terminal.

Optionally, the second output control terminal control circuit includes a fifth transistor and a sixth transistor;

A control electrode of the fifth transistor is electrically connected to the second clock signal terminal, a first electrode of the fifth transistor is electrically connected to the second voltage terminal, and a second electrode of the fifth transistor is electrically connected to the second output control terminal;

A control electrode of the sixth transistor is electrically connected to the first node, a first electrode of the sixth transistor is electrically connected to the second clock signal terminal, and a second electrode of the sixth transistor is electrically connected to the second output control terminal.

Optionally, the on-off control circuit includes a seventh transistor;

A control electrode of the seventh transistor is electrically connected to the second voltage terminal, a first electrode of the seventh transistor is electrically connected to the first node, and a second electrode of the seventh transistor is electrically connected to the first output control terminal.

Optionally, the first output circuit includes a first output transistor, and the second output circuit includes a second output transistor;

A control electrode of the first output transistor is electrically connected to the first output control terminal, a first electrode of the first output transistor is electrically connected to the first clock signal terminal, and a second electrode of the first output transistor is electrically connected to the driving signal output terminal;

A control electrode of the second output transistor is electrically connected to the second output control terminal, a first electrode of the second output transistor is electrically connected to the first voltage terminal, and a second electrode of the second output transistor is electrically connected to the driving signal output terminal.

Optionally, the width-to-length ratio of the first output transistor is greater than the width-to-length ratio of the second output transistor.

In at least one embodiment of the present disclosure, the first output transistor and the second output transistor are used to control an output driving signal. In order to improve the driving capability, the width-to-length ratio of the first output transistor and the width-to-length ratio of the second output transistor are all large. Since the first output transistor is used to output a low-voltage signal, and it is more difficult to output a low-voltage signal, the width-to-length ratio of the first output transistor can be made larger than the width-to-length ratio of the second output transistor to ensure the driving capability.

Figure 5:
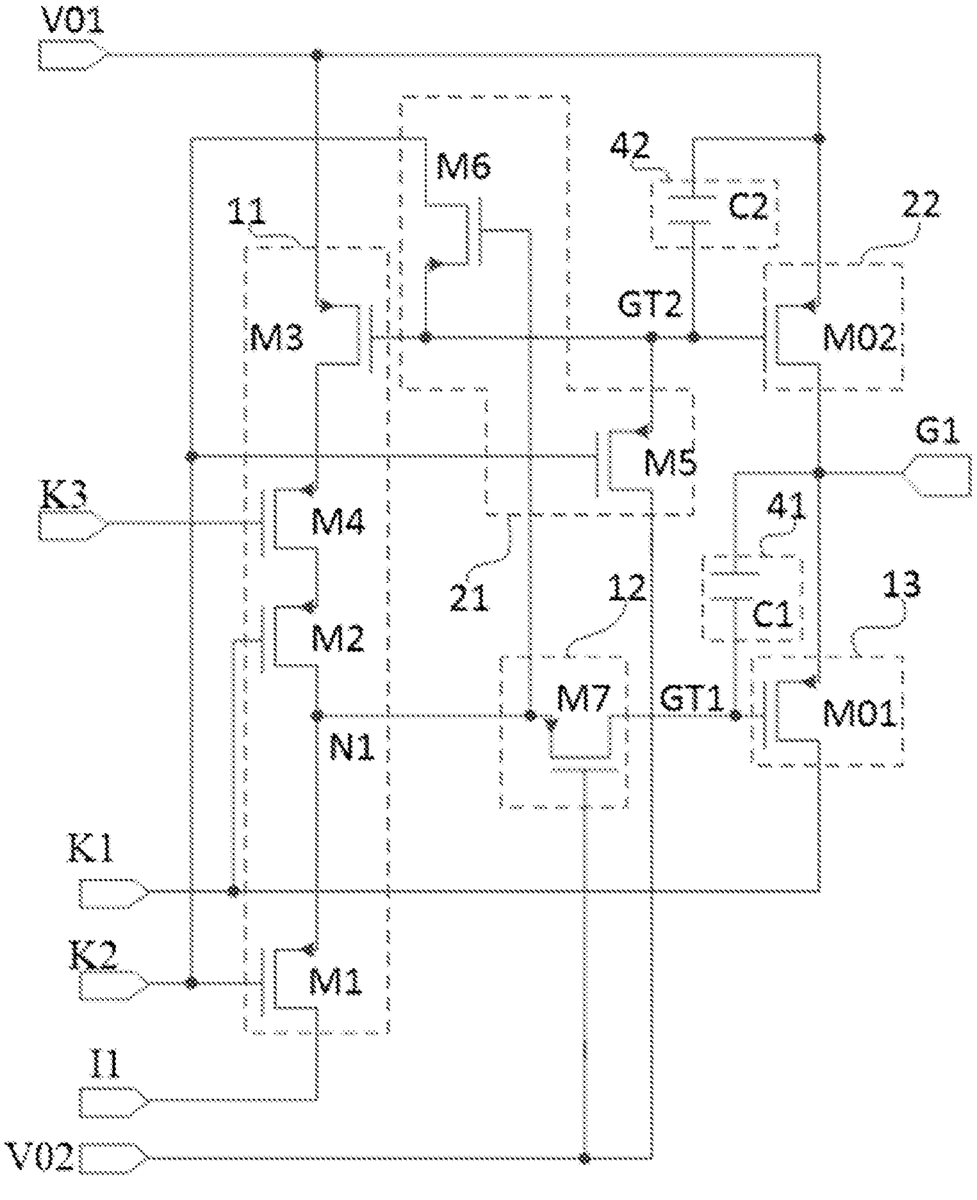
FIG. 5 is a circuit diagram of a driving circuit according to at least one embodiment of the present disclosure.

As shown in FIG. 5, based on the driving circuit shown in FIG. 3, the first node control circuit 11 includes a first transistor M1, a second transistor M2, a third transistor M3 and a fourth transistor M4;

The gate electrode of the first transistor M1 is electrically connected to the second clock signal terminal K2, the source electrode of the first transistor M1 is electrically connected to the input terminal I1, and the drain electrode of the first transistor M1 is electrically connected to the first node N1;

The gate electrode of the second transistor M2 is electrically connected to the first clock signal terminal K1, the source electrode of the second transistor M2 is electrically connected to the first node N1; the drain electrode of the second transistor M2 is electrically connected to the source electrode of the fourth transistor M4;

The gate electrode of the fourth transistor M4 is electrically connected to the third clock signal terminal K3, and the drain electrode of the fourth transistor M4 is electrically connected to the source electrode of the third transistor M3;

The gate electrode of the third transistor M3 is electrically connected to the second output control terminal GT2, and the drain electrode of the third transistor M3 is electrically connected to a high-voltage terminal; the high-voltage terminal is used to provide a high-voltage signal V01;

The first energy storage circuit 41 includes a first capacitor C1, and the second energy storage circuit 42 includes a second capacitor C2;

The first terminal of the second capacitor C2 is electrically connected to the second output control terminal GT2, and the second terminal of the second capacitor C2 is electrically connected to the high voltage terminal;

The first terminal of the first capacitor C1 is electrically connected to the first output control terminal GT1, and the second terminal of the first capacitor C1 is electrically connected to the driving signal output terminal G1;

The second output control terminal control circuit 21 includes a fifth transistor M5 and a sixth transistor M6;

The gate electrode of the fifth transistor M5 is electrically connected to the second clock signal terminal K2, the source electrode of the fifth transistor M5 is electrically connected to the low voltage terminal, and the drain electrode of the fifth transistor M5 is electrically connected to the second output control terminals GT2; the low voltage terminal is used to provide the low voltage signal V02;

The gate electrode of the sixth transistor M6 is electrically connected to the first node N1, the source electrode of the sixth transistor M6 is electrically connected to the second clock signal terminal K2, and the drain electrode of the sixth transistor M6 is electrically connected to the second output control terminal GT2;

The on-off control circuit 12 includes a seventh transistor M7;

The gate electrode of the seventh transistor M7 is electrically connected to the low voltage terminal, the drain electrode of the seventh transistor M7 is electrically connected to the first node N1, and the source electrode of the seventh transistor M7 is electrically connected to the first output control terminal GT1;

The first output circuit 13 includes a first output transistor M01, and the second output circuit 22 includes a second output transistor M02;

The gate electrode of the first output transistor M01 is electrically connected to the first output control terminal GT1, the source electrode of the first output transistor M01 is electrically connected to the first clock signal terminal K1, and the drain electrode of the first output transistor M01 is electrically connected to the driving signal output terminal G1;

The gate electrode of the second output transistor M02 is electrically connected to the second output control terminal GT2, the drain electrode of the second output transistor M02 is electrically connected to the high voltage terminal, and the source electrode of the second output transistor M02 is electrically connected to the driving signal output terminal G1.

In the driving circuit shown in FIG. 5, all transistors are p-type transistors. For example, the transistors may be P-type metal-oxide-semiconductor (PMOS) transistors, but not limited thereto.

In at least one embodiment of the present disclosure, the transistors included in the driving circuit may also be n-type transistors, and each control signal may be changed accordingly.

Optionally, the transistors included in the driving circuit described in at least one embodiment of the present disclosure may all be p-type transistors, or may all be n-type transistors, but not limited thereto.

In at least one embodiment of the driving circuit shown in FIG. 5, the first control terminal is the third clock signal terminal K3, but not limited thereto.

In at least one embodiment of the present disclosure, the third clock signal provided by the third clock signal terminal K3 is inverted in phase to the first clock signal provided by the first clock signal terminal K1, so that in the display period, M2 or M4 are turned off, to disconnect the first node N1 from the first voltage terminal V1 to prevent leakage current from affecting the potential of the first node N1; but not limited to this.

Figure 6:
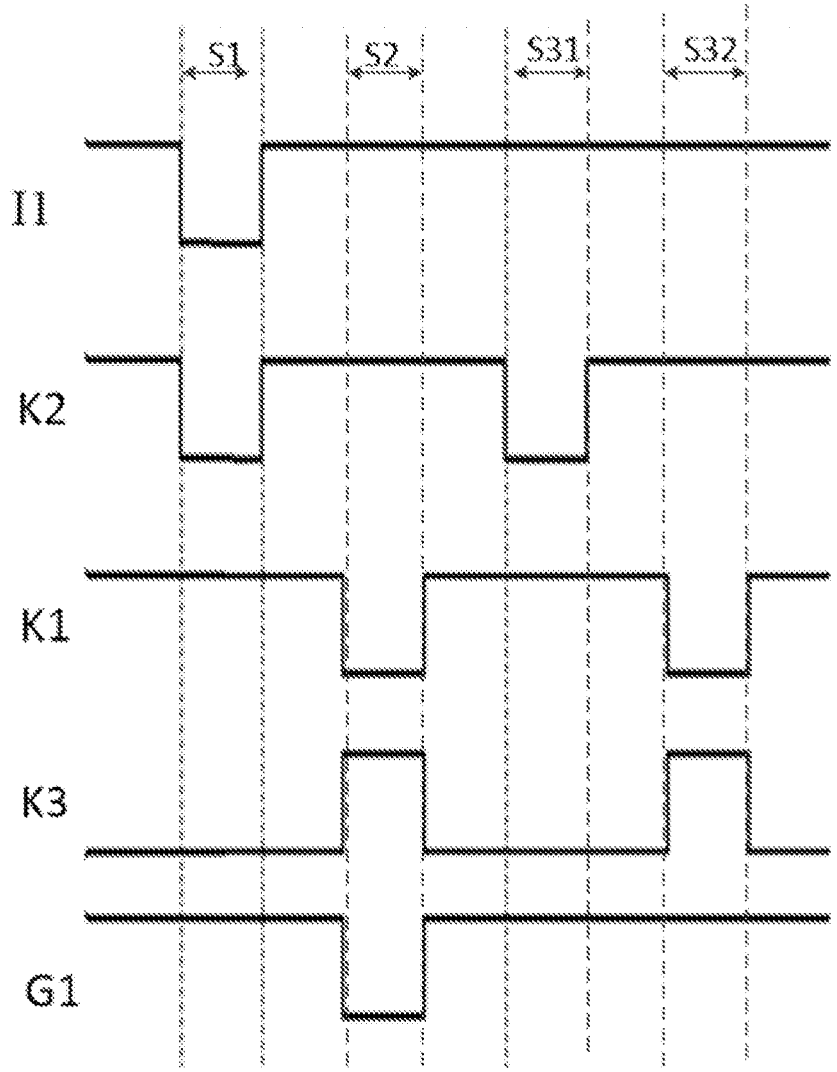
FIG. 6 is a timing diagram of the driving circuit according to at least one embodiment of the present disclosure.

As shown in FIG. 6, when at least one embodiment of the driving circuit shown in FIG. 5 of the present disclosure is in operation, the display period may include an input phase S1, an output phase S2 and a reset phase that are set successively, and the reset phase includes the first reset period S31 and the second reset period S32 that are set successively;

In the input phase S1, K1 provides a high voltage signal, K2 provides a low voltage signal, K3 provides a high voltage signal, I1 provides a low voltage signal, M1 is turned on, the potential of N1 is a low voltage, M2 is turned off, and a low voltage signal provide by I1 is written into the gate electrode of M6 and charge C2, M6 is turned on, the low voltage signal provided by K2 is written into the gate electrode of M02, M02 is turned on, and G1 is connected to the high voltage terminal; M7 is turned on, and the low voltage signal provided by I1 is written into the gate electrode of M01 through M1 and M7 to charge C1 and turn on M01. At this time, the high-voltage signal provided by K1 is written into G1, and G1 outputs a high-voltage signal;

In the input phase S1, the potential of GT1 and the potential of GT2 are both a low voltage;

In the input phase S1, K3 provides a low voltage signal, and M4 is turned on;

In the output phase S2, I1 provides a high-voltage signal, K1 provides a low-voltage signal, K2 provides a high-voltage signal, K3 provides a high-voltage signal, M4 is turned off to disconnect the path between the high-voltage terminal and N1, and C1 maintains the potential of GT1 to be a low voltage, M01 is turned on, G1 outputs a low voltage signal; M7 is turned on, the potential of N1 is a low voltage, M6 is turned on, the high voltage signal provided by K2 is written into GT2, and C2 is charged, so that the potential of GT1 is a high voltage, M02 is turned off;

In the first reset period S31, I1 provides a high voltage signal, K1 provides a high voltage signal, K2 provides a low voltage signal, K3 provides a low voltage signal, M1 and M5 are turned on, and the low voltage signal V02 charges C2 through M5, so that the potential of GT2 is a low voltage, and M3 and M02 are turned on, G1 outputs a high voltage signal; M2 is turned off, and M1 is turned on to write the high voltage signal provided by I1 into N1, and M7 is turned on to charge C1 through the high voltage signal provided by I1, the potential of GT1 is a high voltage, and M01 is turned off;

In the second reset period S31, I1 provides a high voltage signal, K1 provides a low voltage signal, K2 provides a high voltage signal, K3 provides a high voltage signal, M2 is turned on, C2 maintains the potential of GT2 at a low voltage, M3 and M02 are turned on, G1 outputs a high voltage signal, M4 is turned off, C1 maintains the potential of GT1 at a high voltage, and M6, M01, M1 and M5 are turned off.

Figure 7:
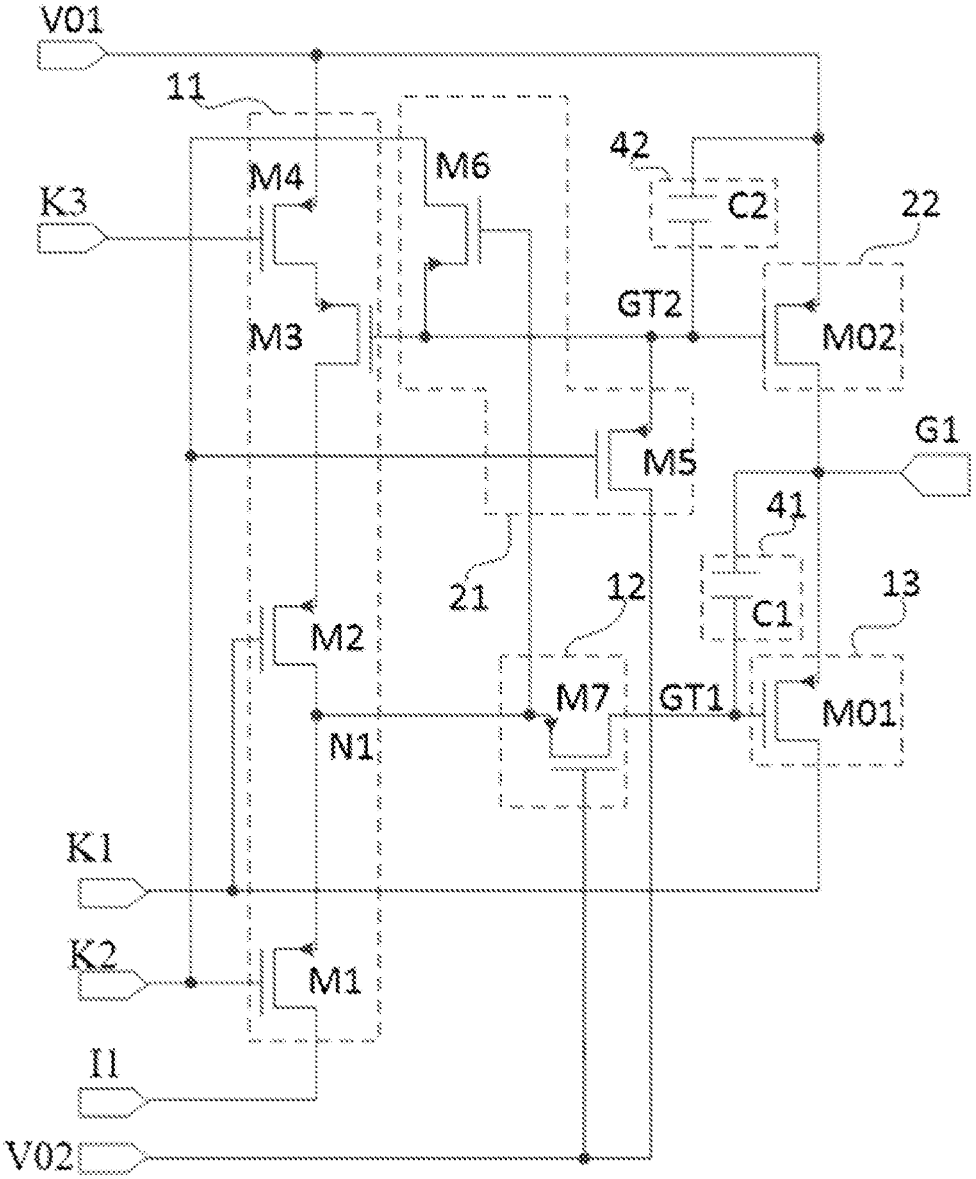
FIG. 7 is a circuit diagram of a driving circuit according to at least one embodiment of the present disclosure.

As shown in FIG. 7, based on the driving circuit shown in FIG. 3, the first node control circuit 11 includes a first transistor M1, a second transistor M2, a third transistor M3 and a fourth transistor M4;

The gate electrode of the first transistor M1 is electrically connected to the second clock signal terminal K2, the source electrode of the first transistor M1 is electrically connected to the input terminal I1, and the drain electrode of the first transistor M1 is electrically connected to the first node N1;

The gate electrode of the second transistor M2 is electrically connected to the first clock signal terminal K1, the source electrode of the second transistor M2 is electrically connected to the first node N1; the drain electrode of the second transistor M2 is electrically connected to the source electrode of the third transistor M3;

The gate electrode of the third transistor M3 is electrically connected to the second output control terminal GT2, and the drain electrode of the third transistor M3 is electrically connected to the source electrode of the fourth transistor M4;

The gate electrode of the fourth transistor M4 is electrically connected to the third clock signal terminal K3, and the drain electrode of the fourth transistor M4 is electrically connected to the high voltage terminal; the high voltage terminal is used to provide the high voltage signal V01;

The first energy storage circuit 41 includes a first capacitor C1, and the second energy storage circuit 42 includes a second capacitor C2;

The first terminal of the second capacitor C2 is electrically connected to the second output control terminal GT2, and the second terminal of the second capacitor C2 is electrically connected to the high voltage terminal;

The first terminal of the first capacitor C1 is electrically connected to the first output control terminal GT1, and the second terminal of the first capacitor C1 is electrically connected to the driving signal output terminal G1;

The second output control terminal control circuit 21 includes a fifth transistor M5 and a sixth transistor M6;

The gate electrode of the fifth transistor M5 is electrically connected to the second clock signal terminal K2, the source electrode of the fifth transistor M5 is electrically connected to the low voltage terminal, and the drain electrode of the fifth transistor M5 is electrically connected to the second output control terminals GT2; the low voltage terminal is used to provide the low voltage signal V02;

The gate electrode of the sixth transistor M6 is electrically connected to the first node N1, the source electrode of the sixth transistor M6 is electrically connected to the second clock signal terminal K2, and the drain electrode of the sixth transistor M6 is electrically connected to the second output control terminal GT2; The on-off control circuit 12 includes a seventh transistor M7;

The gate electrode of the seventh transistor M7 is electrically connected to the low voltage terminal, the drain electrode of the seventh transistor M7 is electrically connected to the first node N1, and the source electrode of the seventh transistor M7 is electrically connected to the first output control terminal GT1;

The first output circuit 13 includes a first output transistor M01, and the second output circuit 22 includes a second output transistor M02;

The gate electrode of the first output transistor M01 is electrically connected to the first output control terminal GT1, the source electrode of the first output transistor M01 is electrically connected to the first clock signal terminal K1, and the drain electrode of the first output transistor M01 is electrically connected to the driving signal output terminal G1;

The gate electrode of the second output transistor M02 is electrically connected to the second output control terminal GT2, the drain electrode of the second output transistor M02 is electrically connected to the high voltage terminal, and the source electrode of the second output transistor M02 is electrically connected to the driving signal output terminal G1.

In at least one embodiment of the driving circuit shown in FIG. 7, all transistors are p-type thin film transistors, but not limited thereto.

In at least one embodiment of the driving circuit shown in FIG. 7, the first control terminal is the third clock signal terminal K3, but not limited thereto.

As shown in FIG. 6, when at least one embodiment of the driving circuit shown in FIG. 7 of the present disclosure is in operation, the display period may include an input phase S1, an output phase S2 and a reset phase that are set successively, and the reset phase includes the first reset period S31 and the second reset period S32 that are set successively;

In the input phase S1, K1 provides a high voltage signal, K2 provides a low voltage signal, K3 provides a high voltage signal, I1 provides a low voltage signal, M1 is turned on, the potential of N1 is a low voltage, M2 is turned off, and a low voltage signal provided by I1 is written into the gate electrode of M6 and charge C2, M6 is turned on, the low voltage signal provided by K2 is written into the gate electrode of M02, M02 is turned on, and G1 is connected to the high voltage terminal; M7 is turned on, and the low voltage signal provided by I1 is written into the gate electrode of M01 through M1 and M7 to charge C1 and turn on M01. At this time, the high-voltage signal provided by K1 is written into G1, and G1 outputs a high-voltage signal;

In the input phase S1, the potential of GT1 and the potential of GT2 are both a low voltage;

In the input phase S1, K3 provides a low voltage signal, and M4 is turned on;

In the output phase S2, I1 provides a high-voltage signal, K1 provides a low-voltage signal, K2 provides a high-voltage signal, K3 provides a high-voltage signal, M4 is turned off to disconnect the path between the high-voltage terminal and N1, and C1 maintains the potential of GT1 to be a low voltage, M01 is turned on, G1 outputs a low voltage signal; M7 is turned on, the potential of N1 is a low voltage, M6 is turned on, the high voltage signal provided by K2 is written into GT2, and C2 is charged, so that the potential of GT1 is a high voltage, M02 is turned off;

In the first reset period S31, I1 provides a high voltage signal, K1 provides a high voltage signal, K2 provides a low voltage signal, K3 provides a low voltage signal, M1 and M5 are turned on, and the low voltage signal V02 charges C2 through M5, so that the potential of GT2 is a low voltage, and M3 and M02 are turned on, G1 outputs a high voltage signal; M2 is turned off, and M1 is turned on to write the high voltage signal provided by I1 into N1, and M7 is turned on to provide the high voltage signal by I1 to charge C1, the potential of GT1 is a high voltage, and M01 is turned off;

In the second reset period S31, I1 provides a high voltage signal, K1 provides a low voltage signal, K2 provides a high voltage signal, K3 provides a high voltage signal, M2 is turned on, C2 maintains the potential of GT2 at a low voltage, M3 and M02 are turned on, G1 outputs a high voltage signal, M4 is turned off, C1 maintains the potential of GT1 at a high voltage, and M6, M01, M1 and M5 are turned off.

Figure 8:
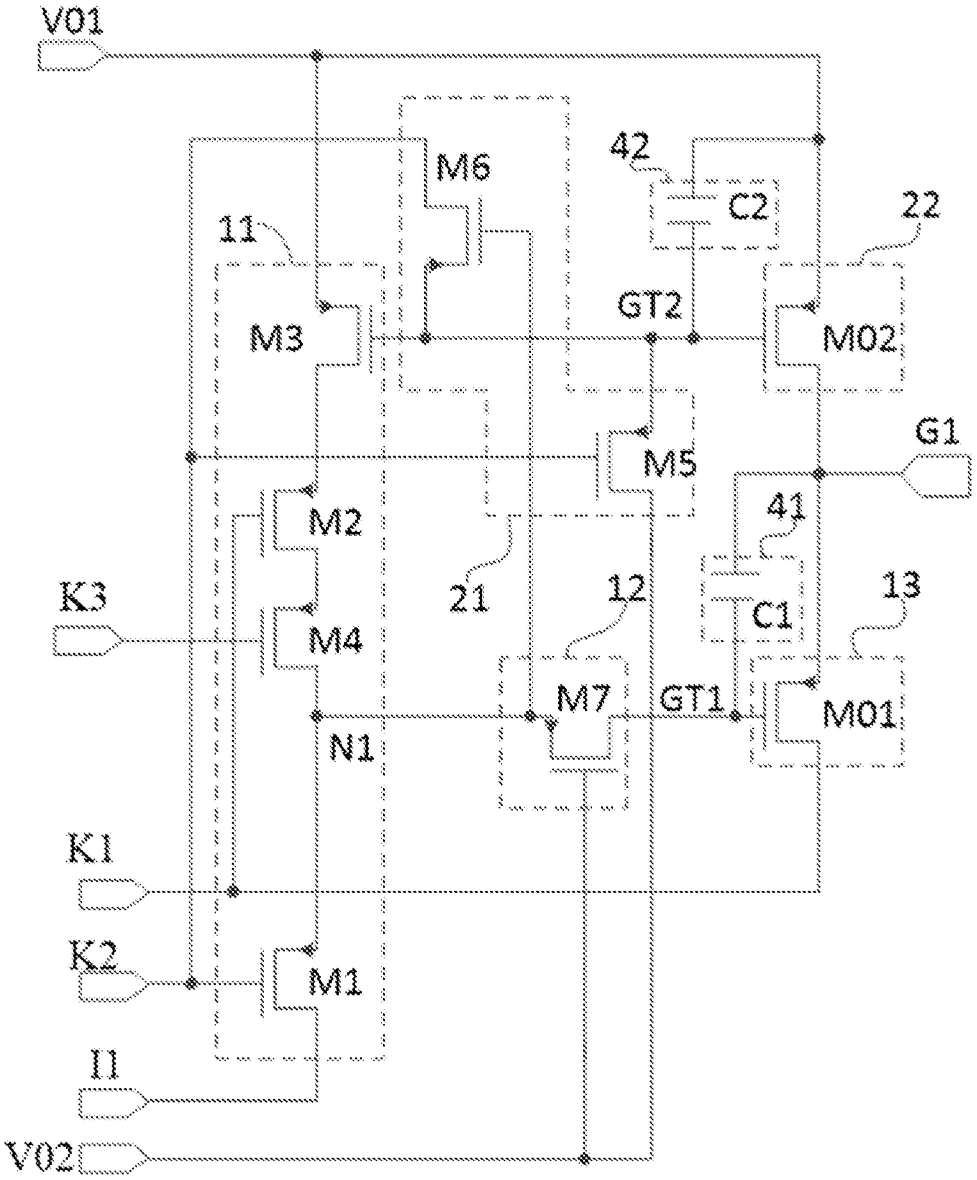
FIG. 8 is a circuit diagram of a driving circuit according to at least one embodiment of the present disclosure.

As shown in FIG. 8, based on the driving circuit shown in FIG. 3, the first node control circuit 11 includes a first transistor M1, a second transistor M2, a third transistor M3 and a fourth transistor M4;

The gate electrode of the first transistor M1 is electrically connected to the second clock signal terminal K2, the source electrode of the first transistor M1 is electrically connected to the input terminal I1, and the drain electrode of the first transistor M1 is electrically connected to the first node N1;

The gate electrode of the fourth transistor M4 is electrically connected to the third clock signal terminal K3, the source electrode of the fourth transistor M4 is electrically connected to the first node N1, and the drain electrode of the fourth transistor M4 is electrically connected to the source electrode of the second transistor M2;

The gate electrode of the second transistor M2 is electrically connected to the first clock signal terminal K1, and the drain electrode of the second transistor M2 is electrically connected to the source electrode of the third transistor M3;

The gate electrode of the third transistor M3 is electrically connected to the second output control terminal GT2, and the drain electrode of the third transistor M3 is electrically connected to the high voltage terminal; the high voltage terminal is used for providing a high voltage signal V01;

The first energy storage circuit 41 includes a first capacitor C1, and the second energy storage circuit 42 includes a second capacitor C2;

The first terminal of the second capacitor C2 is electrically connected to the second output control terminal GT2, and the second terminal of the second capacitor C2 is electrically connected to the high voltage terminal;

The first terminal of the first capacitor C1 is electrically connected to the first output control terminal GT1, and the second terminal of the first capacitor C1 is electrically connected to the driving signal output terminal G1;

The second output control terminal control circuit 21 includes a fifth transistor M5 and a sixth transistor M6;

The gate electrode of the fifth transistor M5 is electrically connected to the second clock signal terminal K2, the source electrode of the fifth transistor M5 is electrically connected to the low voltage terminal, and the drain electrode of the fifth transistor M5 is electrically connected to the second output control terminals GT2; the low voltage terminal is used to provide the low voltage signal V02;

The gate electrode of the sixth transistor M6 is electrically connected to the first node N1, the source electrode of the sixth transistor M6 is electrically connected to the second clock signal terminal K2, and the drain electrode of the sixth transistor M6 is electrically connected to the second output control terminal GT2;

The on-off control circuit 12 includes a seventh transistor M7;

The gate electrode of the seventh transistor M7 is electrically connected to the low voltage terminal, the drain electrode of the seventh transistor M7 is electrically connected to the first node N1, and the source electrode of the seventh transistor M7 is electrically connected to the first output control terminal GT1;

The first output circuit 13 includes a first output transistor M01, and the second output circuit 22 includes a second output transistor M02;

The gate electrode of the first output transistor M01 is electrically connected to the first output control terminal GT1, the source electrode of the first output transistor M01 is electrically connected to the first clock signal terminal K1, and the drain electrode of the first output transistor M01 is electrically connected to the driving signal output terminal G1;

The gate electrode of the second output transistor M02 is electrically connected to the second output control terminal GT2, the drain electrode of the second output transistor M02 is electrically connected to the high voltage terminal, and the source electrode of the second output transistor M02 is electrically connected to the driving signal output terminal G1.

In at least one embodiment of the driving circuit shown in FIG. 8, all transistors are p-type thin film transistors, but not limited thereto.

In at least one embodiment of the driving circuit shown in FIG. 8, the first control terminal is the third clock signal terminal K3, but not limited thereto.

As shown in FIG. 6, when at least one embodiment of the driving circuit shown in FIG. 8 of the present disclosure is in operation, the display period may include an input phase S1, an output phase S2 and a reset phase that are set successively, and the reset phase includes the first reset period S31 and the second reset period S32 that are set successively;

In the input phase S1, K1 provides a high voltage signal, K2 provides a low voltage signal, K3 provides a high voltage signal, I1 provides a low voltage signal, M1 is turned on, the potential of N1 is a low voltage, M2 is turned off, and a low voltage signal provided by I1 is written into the gate electrode of M6 and charge C2, M6 is turned on, the low voltage signal provided by K2 is written into the gate electrode of M02, M02 is turned on, and G1 is connected to the high voltage terminal; M7 is turned on, and the low voltage signal provided by I1 is written into the gate electrode of M01 through M1 and M7 to charge C1 and turn on M01. At this time, the high-voltage signal provided by K1 is written into G1, and G1 outputs a high-voltage signal;

In the input phase S1, the potential of GT1 and the potential of GT2 are both a low voltage;

In the input phase S1, K3 provides a low voltage signal, and M4 is turned on;

In the output phase S2, I1 provides a high-voltage signal, K1 provides a low-voltage signal, K2 provides a high-voltage signal, K3 provides a high-voltage signal, M4 is turned off to disconnect the path between the high-voltage terminal and N1, and C1 maintains the potential of GT1 to be a low voltage, M01 is turned on, G1 outputs a low voltage signal; M7 is turned on, the potential of N1 is a low voltage, M6 is turned on, the high voltage signal provided by K2 is written into GT2, and C2 is charged, so that the potential of GT1 is a high voltage, M02 is turned off;

In the first reset period S31, I1 provides a high voltage signal, K1 provides a high voltage signal, K2 provides a low voltage signal, K3 provides a low voltage signal, M1 and M5 are turned on, and the low voltage signal V02 charges C2 through M5, so that the potential of GT2 is a low voltage, and M3 and M02 are turned on, G1 outputs a high voltage signal; M2 is turned off, and M1 is turned on to write the high voltage signal provided by I1 into N1, and M7 is turned on to provide the high voltage by I1 to charge C1, the potential of GT1 is a high voltage, and M01 is turned off;

In the second reset period S31, I1 provides a high voltage signal, K1 provides a low voltage signal, K2 provides a high voltage signal, K3 provides a high voltage signal, M2 is turned on, C2 maintains the potential of GT2 at a low voltage, M3 and M02 are turned on, G1 outputs a high voltage signal, M4 is turned off, C1 maintains the potential of GT1 at a high voltage, and M6, M01, M1 and M5 are turned off.

Figure 9:
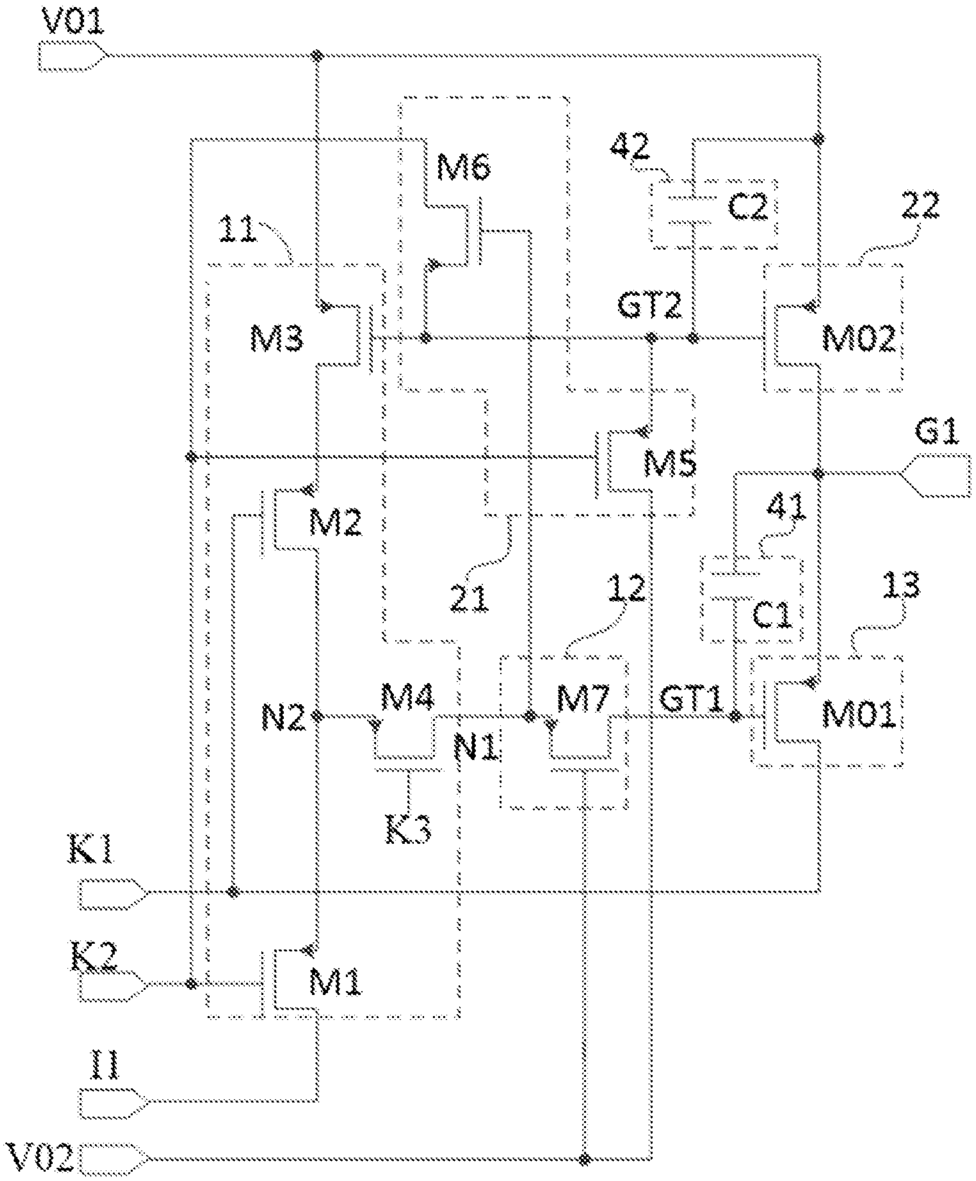
FIG. 9 is a circuit diagram of a driving circuit according to at least one embodiment of the present disclosure.

As shown in FIG. 9, based on at least one embodiment of the driving circuit shown in FIG. 4, the first node control circuit 11 includes a first transistor M1, a second transistor M2, a third transistor M3 and a fourth transistor M4;

The gate electrode of the first transistor M1 is electrically connected to the second clock signal terminal K2, the source electrode of the first transistor M1 is electrically connected to the input terminal I1, and the drain electrode of the first transistor M1 is electrically connected to the second node N2;

The gate electrode of the fourth transistor M4 is electrically connected to the third clock signal terminal K3, the source electrode of the fourth transistor M4 is electrically connected to the second node N2, and the drain electrode of the fourth transistor is electrically connected to the first node N1;

The gate electrode of the second transistor M2 is electrically connected to the first clock signal terminal K1, the source electrode of the second transistor M2 is electrically connected to the second node N2, and the drain electrode of the second transistor M2 is electrically connected to the source electrode of the third transistor M3;

The gate electrode of the third transistor M3 is electrically connected to the second output control terminal GT2, and the drain electrode of the third transistor M3 is electrically connected to the high voltage terminal; the high voltage terminal is used for providing a high voltage signal V01;

The first energy storage circuit 41 includes a first capacitor C1, and the second energy storage circuit 42 includes a second capacitor C2;

The first terminal of the second capacitor C2 is electrically connected to the second output control terminal GT2, and the second terminal of the second capacitor C2 is electrically connected to the high voltage terminal;

The first terminal of the first capacitor C1 is electrically connected to the first output control terminal GT1, and the second terminal of the first capacitor C1 is electrically connected to the driving signal output terminal G1;

The second output control terminal control circuit 21 includes a fifth transistor M5 and a sixth transistor M6;

The gate electrode of the fifth transistor M5 is electrically connected to the second clock signal terminal K2, the source electrode of the fifth transistor M5 is electrically connected to the low voltage terminal, and the drain electrode of the fifth transistor M5 is electrically connected to the second output control terminals GT2; the low voltage terminal is used to provide the low voltage signal V02;

The gate electrode of the sixth transistor M6 is electrically connected to the first node N1, the source electrode of the sixth transistor M6 is electrically connected to the second clock signal terminal K2, and the drain electrode of the sixth transistor M6 is electrically connected to the second output control terminal GT2;

The on-off control circuit 12 includes a seventh transistor M7;

The gate electrode of the seventh transistor M7 is electrically connected to the low voltage terminal, the drain electrode of the seventh transistor M7 is electrically connected to the first node N1, and the source electrode of the seventh transistor M7 is electrically connected to the first output control terminal GT1;

The first output circuit 13 includes a first output transistor M01, and the second output circuit 22 includes a second output transistor M02;

The gate electrode of the first output transistor M01 is electrically connected to the first output control terminal GT1, the source electrode of the first output transistor M01 is electrically connected to the first clock signal terminal K1, and the drain electrode of the first output transistor M01 is electrically connected to the driving signal output terminal G1;

The gate electrode of the second output transistor M02 is electrically connected to the second output control terminal GT2, the drain electrode of the second output transistor M02 is electrically connected to the high voltage terminal, and the source electrode of the second output transistor M02 is electrically connected to the driving signal output terminal G1.

In at least one embodiment of the driving circuit shown in FIG. 9, all transistors are p-type thin film transistors, but not limited thereto.

In at least one embodiment of the driving circuit shown in FIG. 9, the first control terminal is the third clock signal terminal K3, but not limited thereto.

As shown in FIG. 6, when at least one embodiment of the driving circuit shown in FIG. 9 of the present disclosure is in operation, the display period may include an input phase S1, an output phase S2 and a reset phase that are set successively, and the reset phase includes the first reset period S31 and the second reset period S32 that are set successively;

In the input phase S1, K1 provides a high voltage signal, K2 provides a low voltage signal, K3 provides a high voltage signal, I1 provides a low voltage signal, M1 is turned on, M2 is turned off, the low voltage signal provided by I1 is written into the gate electrode of M6 and charge C2, M6 is turned on, the low voltage signal provided by K2 is written into the gate electrode of M02, M02 is turned on, G1 is connected with the high voltage terminal; M7 is turned on, the low voltage signal provided by I1 is written into the gate electrode of M01 through M1 and M7 to charge C1 and turn on M01. At this time, the high-voltage signal provided by K1 is written into G1, and G1 outputs a high-voltage signal;

In the input phase S1, the potential of GT1 and the potential of GT2 are both a low voltage;

In the input phase S1, K3 provides a low voltage signal, M4 is turned on, and the potential of N1 is a low voltage;

In the output phase S2, I1 provides a high-voltage signal, K1 provides a low-voltage signal, K2 provides a high-voltage signal, K3 provides a high-voltage signal, M4 is turned off to disconnect the path between the high-voltage terminal and N1, and C1 maintains the potential of GT1 at a low voltage, M01 is turned on, G1 outputs a low voltage signal; M7 is turned on, the potential of N1 is a low voltage, M6 is turned on, the high voltage signal provided by K2 is written into GT2, and C2 is charged, so that the potential of GT1 is a high voltage, M02 is turned off;

In the first reset period S31, I1 provides a high voltage signal, K1 provides a high voltage signal, K2 provides a low voltage signal, K3 provides a low voltage signal, M1 and M5 are turned on, and the low voltage signal V02 charges C2 through M5, so that the potential of GT2 is a low voltage, and M3 and M02 are turned on, G1 outputs a high voltage signal; M2 is turned off, and M1 is turned on to write the high voltage signal provided by I1 into N1, and M7 is turned on to provide the high voltage by I1 to charge C1, the potential of GT1 is a high voltage, and M01 is turned off;

In the second reset period S31, I1 provides a high voltage signal, K1 provides a low voltage signal, K2 provides a high voltage signal, K3 provides a high voltage signal, M2 is turned on, C2 maintains the potential of GT2 at a low voltage, M3 and M02 are turned on, G1 outputs a high voltage signal, M4 is turned off, C1 maintains the potential of GT1 at a high voltage, and M6, M01, M1 and M5 are turned off.

The driving module according to the embodiment of the present disclosure includes a plurality of stages of driving circuits.

Figure 10:
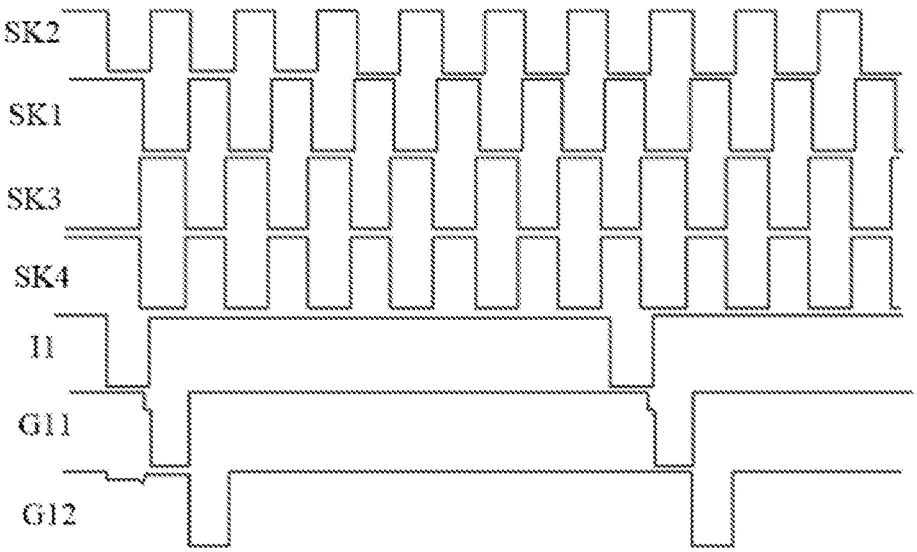
FIG. 10 is a timing diagram of the driving module according to at least one embodiment of the present disclosure.

The driving module described in the embodiments of the present disclosure may include a first stage of driving circuit and a second stage of driving circuit;

The first clock signal terminal of the first stage of driving circuit is electrically connected to the first clock signal line SK1, the second clock signal terminal of the first stage of driving circuit is electrically connected to the second clock signal line SK2, and the third clock signal terminal of the first stage of driving circuit is electrically connected to the third clock signal line SK3;

The first clock signal terminal of the second stage of driving circuit is electrically connected to the second clock signal line SK2, the second clock signal terminal of the first stage of driving circuit is electrically connected to the first clock signal line SK2, and the third clock signal terminal of the first stage of driving circuit is electrically connected to the third clock signal line SK4;

FIG. 10 shows the waveform diagram of the clock signal provided by the first clock signal line SK1, the waveform diagram of the clock signal provided by the second clock signal line SK2, the waveform diagram of the clock signal provided by the third clock signal line SK3, the waveform diagram of the clock signal provided by the fourth clock signal line SK4, the waveform diagram of the input signal provided by the input terminal I1 electrically connected to the first stage of driving circuit, the waveform diagram of the driving signal G11 outputted by the first stage of driving circuit, and the waveform diagram of the driving signal G12 outputted by the second stage of driving circuit.

In at least one embodiment of the present disclosure, the clock signal provided by the first clock signal line SK1 and the clock signal provided by the third clock signal line SK3 may be inverted in phase, but not limited thereto.

The driving method described in the embodiment of the present disclosure is applied to the above-mentioned driving circuit, and the display period includes an output phase;

The driving method includes: in the output phase, controlling, by the first node control circuit, to disconnect the first node from the first voltage terminal under the control of the first control signal, and controlling, by the on-off control circuit, to connect the first node and the first output control terminal under the control of the second voltage signal, and controlling, by the first output circuit, to connect the driving signal output terminal and the first clock signal terminal under the control of the potential of the first output control terminal.

The driving method described in the embodiment of the present disclosure controls to disconnect the first node from the first voltage terminal through the first node control circuit under the control of the first control signal in the output phase, so as to avoid the potential of the first output control terminal and the potential of the first output control terminal to be the first voltage in the output phase, so that the first output circuit can control to connect the driving signal output terminal and the first clock signal terminal under the control of the potential of the first output control terminal in the output phase, to output the driving signal normally.

In at least one embodiment of the present disclosure, the driving circuit further includes a second output control terminal control circuit and a second output circuit; the display period further includes an input phase arranged before the output phase; the driving method further includes:

In the input phase, controlling, by the second output control terminal control circuit, to connect the second output control terminal and the second voltage terminal under the control of the second clock signal, so that the second output circuit controls to connect the driving signal output terminal and the first voltage terminal under the control of the potential of the second output control terminal;

In the output phase, controlling, by the second output control terminal control circuit, to connect the second output control terminal and the second clock signal terminal under the control of the potential of the first node, so that the second output circuit controls to disconnect the driving signal output terminal from the first voltage terminal under the control of the potential of the second output control terminal.

In a specific implementation, the driving circuit further includes a second output control terminal control circuit and a second output circuit, the second output control terminal control circuit controls the potential of the second output control terminal, and the second output circuit controls to connect or disconnect the driving signal output terminal and the first voltage terminal under the control of the potential of the second output control terminal.

Optionally, the first node control circuit is further electrically connected to the second clock signal terminal and the input terminal respectively; the driving circuit further includes a first energy storage circuit and a second energy storage circuit; the driving method further includes:

In the input phase, providing, by the input terminal, an input signal, and controlling, by the first node control circuit, the input terminal to provide the input signal to the first node under the control of the second clock signal; controlling, by the on-off control circuit, to connect the first node and the first output control terminal under the control of the second voltage signal provided by the second voltage terminal, to charge the first energy storage circuit, and controlling, by the first output circuit, to connect the driving signal output terminal and the first clock signal terminal under the control of the potential of the first output control terminal.

In specific implementation, the first node control circuit can control the input signal to be written into the first node in the input phase, and the on-off control circuit can control to connect the first node and the first output control terminal under the control of the second voltage signal. In the input phase, the first output circuit controls to connect the driving signal output terminal and the first clock signal terminal under the control of the potential of the first output control terminal.

In at least one embodiment of the present disclosure, the display period further includes a reset phase disposed after the output phase; the reset phase includes a first reset period and a second reset period; the driving method further includes:

In the first reset period, providing, by the input terminal, the first voltage signal, and the potential of the second clock signal provided by the second clock signal terminal being the second voltage; controlling, by the first node control circuit, to connect the first node and the input terminal under the control of the second clock signal, so that the potential of the first node is the first voltage, and controlling, by the on-off control circuit, to connect the first node and the first output control terminal under the control of the second voltage signal provided by the second voltage terminal, to charge the first energy storage circuit, so that the potential of the first output control terminal is the first voltage; controlling, by the first output circuit, to disconnect the driving signal output terminal from the first clock signal terminal under the control of the potential of the first output control terminal; controlling, by the second output control terminal control circuit, to connect the second output control terminal and the second voltage terminal under the control of the second clock signal to charge the second energy storage circuit, so that the potential of the second output control terminal is the second voltage, and controlling, by the second output circuit, to connect the driving signal output terminal and the first voltage terminal under the control of the potential of the second output control terminal, so that the driving signal output terminal outputs a first voltage signal;

In the second reset period, maintaining, by the second energy storage circuit, the potential of the second output control terminal, and controlling, by the second output circuit, to connect the driving signal output terminal and the first voltage terminal under the control of the potential of the second output control terminal; maintaining, by the first energy storage circuit, the potential of the first output control terminal, and controlling, by the first output circuit, to disconnect the driving signal output terminal from the first clock signal terminal under the control of the first output control terminal.

The display device according to the embodiment of the present disclosure includes the above-mentioned driving module.

The display device described in at least one embodiment of the present disclosure may be a silicon-based OLED display device, but is not limited thereto.

The display device provided by at least one embodiment of the present disclosure may be any product or component with a display function, such as a mobile phone, a tablet computer, a TV, a monitor, a notebook computer, a digital photo frame, and a navigator.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A driving circuit, comprising a driving signal output terminal, a first node control circuit, an on-off control circuit and a first output circuit;

the first node control circuit is respectively electrically connected to a first control terminal, a first voltage terminal, a first node, a second input control terminal and a first clock signal terminal, and is configured to control to connect or disconnect the first node and the first voltage terminal under the control of a first control signal provided by the first control terminal, and control to connect or disconnect the first node and the first voltage terminal under the control of a first clock signal provided by the first clock signal terminal; the first control terminal is different from the first clock signal terminal;

the on-off control circuit is electrically connected to a second voltage terminal, the first node and a first output control terminal respectively, and is configured to control to connect or disconnect the first node and the first output control terminal under the control of a second voltage signal provided by the second voltage terminal;

the first output circuit is electrically connected to the first output control terminal, the first clock signal terminal and the driving signal output terminal respectively, and is configured to control to connect or disconnect the driving signal output terminal and the first clock signal terminal under the control of a potential of the first output control terminal;

wherein the driving circuit further comprises a second output control terminal control circuit and a second output circuit; wherein the second output control terminal control circuit is electrically connected to the first node, a second output control terminal, a second clock signal terminal and the second voltage terminal respectively, and is configured to control to connect or disconnect the second output control terminal and the second clock signal terminal under the control of a potential of the first node, control to connect or disconnect the second output control terminal and the second voltage terminal under the control of a second clock signal provided by the second clock signal terminal;

the second output circuit is respectively electrically connected to the second output control terminal, the first voltage terminal and the driving signal output terminal, and is configured to control to connect or disconnect the driving signal output terminal and the first voltage terminal under the control of a potential of the second output control terminal;

wherein the first control terminal is not connected directly to the second output control terminal, and the first control terminal is connected to the second output control terminal via the first node control circuit and the second output control terminal control circuit.

2. The driving circuit according to claim 1, wherein transistors included in the first node control circuit are all p-type transistors; or, the transistors included in the first node control circuit are all n-type transistors;

the first control signal and the first clock signal are inversed in phase.

3. The driving circuit according to claim 1, wherein the first node control circuit is electrically connected to the second output control terminal, a second clock signal terminal and an input terminal, respectively, is configured to control to connect or disconnect the first node and the first voltage terminal under the control of a potential of the second output control terminal, and control to connect or disconnect the first node and the input terminal under the control of a second clock signal provided by the second clock signal terminal.

4. The driving circuit according to claim 3, wherein the first node control circuit includes a first transistor, a second transistor, a third transistor and a fourth transistor;

a control electrode of the first transistor is electrically connected to the second clock signal terminal, a first electrode of the first transistor is electrically connected to the input terminal, and a second electrode of the first transistor is electrically connected to the first node;

a control electrode of the second transistor is electrically connected to the first clock signal terminal, and a first electrode of the second transistor is electrically connected to the first node;

a control electrode of the third transistor is electrically connected to the second output control terminal, a first electrode of the third transistor is electrically connected to a second electrode of the second transistor, and a second electrode of the third transistor is electrically connected to the first voltage terminal;

the first voltage terminal is electrically connected to the second electrode of the third transistor through the fourth transistor; or, the first electrode of the third transistor is connected to the second electrode of the second transistor through the fourth transistor; or the first electrode of the second transistor is electrically connected to the first node through the fourth transistor;

a control electrode of the fourth transistor is electrically connected to the first control terminal.

5. The driving circuit according to claim 1, wherein the first node control circuit is electrically connected to the second output control terminal, a second clock signal terminal and an input terminal, respectively, is configured to control to connect or disconnect the first node and the first voltage terminal under the control of a potential of the second output control terminal, and control to connect or disconnect the first node and the input terminal under the control of the first control signal and a second clock signal provided by the second clock signal terminal.

6. The driving circuit according to claim 5, wherein the first node control circuit includes a first transistor, a second transistor, a third transistor and a fourth transistor;

a control electrode of the first transistor is electrically connected to the second clock signal terminal, a first electrode of the first transistor is electrically connected to the input terminal, and a second electrode of the first transistor is electrically connected to a second node;

a control electrode of the second transistor is electrically connected to the first clock signal terminal, and a first electrode of the second transistor is electrically connected to the second node;

a control electrode of the third transistor is electrically connected to the second output control terminal, a first electrode of the third transistor is electrically connected to the second electrode of the second transistor, and a second electrode of the third transistor is electrically connected to the first voltage terminal;

a control electrode of the fourth transistor is electrically connected to the first control terminal, a first electrode of the fourth transistor is electrically connected to the second node, and a second electrode of the fourth transistor is electrically connected to the first node.

7. The driving circuit according to claim 4, wherein the fourth transistor is a dual gate transistor, wherein a width-to-length ratio of the fourth transistor is equal to a width-to-length ratio of the second transistor.

8. The driving circuit according to claim 1, further comprising a first energy storage circuit and a second energy storage circuit; wherein the first energy storage circuit is electrically connected to the first output control terminal, and is configured to store electrical energy;

the second energy storage circuit is electrically connected to the second output control terminal, and is configured to store electrical energy.

9. The driving circuit according to claim 8, wherein the first energy storage circuit includes a first capacitor, and the second energy storage circuit includes a second capacitor;

a first terminal of the second capacitor is electrically connected to the second output control terminal, and a second terminal of the second capacitor is electrically connected to the first voltage terminal;

a first terminal of the first capacitor is electrically connected to the first output control terminal, and a second terminal of the first capacitor is electrically connected to the driving signal output terminal.

10. The driving circuit according to claim 1, wherein the second output control terminal control circuit includes a fifth transistor and a sixth transistor;

a control electrode of the fifth transistor is electrically connected to the second clock signal terminal, a first electrode of the fifth transistor is electrically connected to the second voltage terminal, and a second electrode of the fifth transistor is electrically connected to the second output control terminal;

a control electrode of the sixth transistor is electrically connected to the first node, a first electrode of the sixth transistor is electrically connected to the second clock signal terminal, and a second electrode of the sixth transistor is electrically connected to the second output control terminal.

11. The driving circuit according to claim 1, wherein the on-off control circuit comprises a seventh transistor;

a control electrode of the seventh transistor is electrically connected to the second voltage terminal, a first electrode of the seventh transistor is electrically connected to the first node, and a second electrode of the seventh transistor is electrically connected to the first output control terminal.

12. The driving circuit according to claim 1, wherein the first output circuit includes a first output transistor, and the second output circuit includes a second output transistor;

a control electrode of the first output transistor is electrically connected to the first output control terminal, a first electrode of the first output transistor is electrically connected to the first clock signal terminal, and a second electrode of the first output transistor is electrically connected to the driving signal output terminal;

a control electrode of the second output transistor is electrically connected to the second output control terminal, a first electrode of the second output transistor is electrically connected to the first voltage terminal, and a second electrode of the second output transistor is electrically connected to the driving signal output terminal.

13. The driving circuit according to claim 12, wherein a width-to-length ratio of the first output transistor is greater than a width-to-length ratio of the second output transistor.

14. A driving module comprising a plurality of stages of driving circuits according to claim 1.

15. A driving method, applied to the driving circuit according to claim 1, wherein the display period includes an output phase;

the driving method includes: in the output phase, controlling, by the first node control circuit, to disconnect the first node from the first voltage terminal under the control of the first control signal, and controlling, by the on-off control circuit, to connect the first node and the first output control terminal under the control of the second voltage signal, and controlling, by the first output circuit, to connect the driving signal output terminal and the first clock signal terminal under the control of the potential of the first output control terminal.

16. The driving method according to claim 15, wherein the display period further includes an input phase arranged before the output phase; the driving method further includes:

in the input phase, controlling, by the second output control terminal control circuit, to connect the second output control terminal and the second voltage terminal under the control of the second clock signal, so that the second output circuit controls to connect the driving signal output terminal and the first voltage terminal under the control of a potential of the second output control terminal;

in the output phase, controlling, by the second output control terminal control circuit, to connect the second output control terminal and the second clock signal terminal under the control of a potential of the first node, so that the second output circuit controls to disconnect the driving signal output terminal from the first voltage terminal under the control of a potential of the second output control terminal.

17. The driving method according to claim 16, wherein the first node control circuit is further electrically connected to the second clock signal terminal and the input terminal respectively; the driving circuit further includes a first energy storage circuit and a second energy storage circuit; the driving method further includes:

in the input phase, providing, by the input terminal, an input signal, and controlling, by the first node control circuit, the input terminal to provide the input signal to the first node under the control of the second clock signal; controlling, by the on-off control circuit, to connect the first node and the first output control terminal under the control of the second voltage signal provided by the second voltage terminal, to charge the first energy storage circuit, and controlling, by the first output circuit, to connect the driving signal output terminal and the first clock signal terminal under the control of a potential of the first output control terminal.

18. The driving method according to claim 17, wherein the display period further includes a reset phase after the output phase; the reset phase includes a first reset period and a second reset period; the driving method further includes:

in the first reset period, providing, by the input terminal, the first voltage signal, and the potential of the second clock signal provided by the second clock signal terminal being the second voltage; controlling, by the first node control circuit, to connect the first node and the input terminal under the control of the second clock signal, so that the potential of the first node is the first voltage, and controlling, by the on-off control circuit, to connect the first node and the first output control terminal under the control of the second voltage signal provided by the second voltage terminal, to charge the first energy storage circuit, so that the potential of the first output control terminal is the first voltage; controlling, by the first output circuit, to disconnect the driving signal output terminal from the first clock signal terminal under the control of the potential of the first output control terminal; controlling, by the second output control terminal control circuit, to connect the second output control terminal and the second voltage terminal under the control of the second clock signal to charge the second energy storage circuit, so that the potential of the second output control terminal is the second voltage, and controlling, by the second output circuit, to connect the driving signal output terminal and the first voltage terminal under the control of the potential of the second output control terminal;

in the second reset period, maintaining, by the second energy storage circuit, the potential of the second output control terminal, and controlling, by the second output circuit, to connect the driving signal output terminal and the first voltage terminal under the control of a potential of the second output control terminal; maintaining, by the first energy storage circuit, the potential of the first output control terminal, and controlling, by the first output circuit, to disconnect the driving signal output terminal from the first clock signal terminal under the control of the first output control terminal.

19. A display device comprising the driving module according to claim 14.

* * * * *